US 6,600,845 B1

(12) United States Patent
Feldman et al.

(10) Patent No.: US 6,600,845 B1
(45) Date of Patent: *Jul. 29, 2003

(54) INTEGRATED PARALLEL TRANSMITTER

(75) Inventors: Michael R. Feldman, Charlotte, NC (US); Robert D. Te Kolste, Charlotte, NC (US); Alan D. Kathman, Charlotte, NC (US); Eric G. Johnson, Winter Park, FL (US)

(73) Assignee: Digital Optics Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/690,763

(22) Filed: Oct. 18, 2000

Related U.S. Application Data

(60) Provisional application No. 60/159,642, filed on Oct. 18, 1999.

(51) Int. Cl.⁷ .................................................. G02B 6/12
(52) U.S. Cl. ........................... 385/14; 385/15; 385/27; 385/39; 385/47; 385/48; 385/49
(58) Field of Search ........................... 385/14, 15, 27, 385/31, 37, 39, 47, 48, 49

(56) References Cited

U.S. PATENT DOCUMENTS

| | | | |
|---|---|---|---|
| 5,696,862 A | * 12/1997 | Hauer et al. | 385/88 |
| 5,757,836 A | 5/1998 | Jiang et al. | |
| 5,774,486 A | 6/1998 | Jiang et al. | |
| 5,809,050 A | * 9/1998 | Baldwin et al. | 372/43 |
| 5,997,185 A | 12/1999 | Kropp | |
| 6,069,905 A | * 5/2000 | Davis et al. | 372/43 |
| 6,081,638 A | * 6/2000 | Zhou | 385/31 |
| 6,198,864 B1 | 3/2001 | Lemoff | |
| 6,243,508 B1 | 6/2001 | Jewell et al. | |
| 6,314,223 B1 | * 11/2001 | Te Kolste et al. | 385/48 |
| 6,419,404 B1 | * 7/2002 | Deri et al. | 385/89 |

OTHER PUBLICATIONS

Hu et al., Multimode WDM Optical Data Links with Monolithically Integrated Multiple-Channel VCSEL and Photodetector Arrays IEEE Journal of Quantum Electronics, vol. 34, No. 8, Aug. 1998, pp. 1403–1414.*

* cited by examiner

*Primary Examiner*—Akm E. Ullah
*Assistant Examiner*—Jennifer Doan
(74) *Attorney, Agent, or Firm*—Susan S. Morse

(57) ABSTRACT

An integrated parallel transmitter includes an array of light sources, a corresponding array of diffractive elements splitting off a portion of the beam to be monitored, a corresponding array of power monitors for respectively monitoring each light source, and an array of couplers that couples light into a corresponding waveguide. The coupler is preferably a phase-matched coupler. All of the passive optical elements are integrated onto a single substrate or a plurality of substrates that have been bonded together on a wafer level.

28 Claims, 3 Drawing Sheets

INTEGRATED PARALLEL TRANSMITTER

CROSS-REFERENCES TO RELATED APPLICATIONS

The present application claims priority under to U.S. Provisional Application No. 60/159,642 filed on Oct. 18, 1999, the entire contents of which are hereby incorporated by reference for all purposes.

BACKGROUND OF THE INVENTION

1. Field of the Invention

The present invention is directed to coupling and monitoring power of parallel arrays of light emitting device, more particularly for an array of vertical cavity surface emitting lasers (VCSELs), while also coupling the light from the light emitting devices into a corresponding array of fibers.

2. Description of Related Art

Light emitting devices such as VCSELs need some form of power control to maintain a constant output. Such control is typically automatically performed by measuring an output of a light emitting device during operation and using this measurement to control the power supplied to the light-emitting device.

Such control may be easily achieved when the light-emitting device to be controlled is an edge-emitting laser because edge emitting lasers output light from two ends thereof. Thus, one output may be used for the desired application, while the other output may be used for the power control.

In contrast, a VCSEL typically only emits light from one surface. Hence, any monitoring of the light must be from the same output as used for the desired application of the VCSEL. VCSELs are much cheaper and their surface emissions make them easier to integrate with other optical devices than the edge emitting lasers, so the use of VCSELs is very desirable.

Previous attempts to monitor the power of VCSELS typically involve splitting off of a portion of the output beam to use as a monitor beam. Examples of such configurations are disclosed in U.S. Pat. Nos. 5,757,836 and 5,774,486. However, such splitting off obscures part of the beam which may affect the wavefront and imaging, and hence coupling, of the light. Further, if the intensity distribution changes, such as when there is a change in lasing mode, the monitored power may change in a way which does not represent the overall output power of the VCSEL.

Additionally, splitting off of the beam may require the output of the VCSEL to be increased in order to maintain the requisite power level while allowing detection. Previous uses of scattering the beam to create a monitor beam relied on reflection for directing the beam and did not provide an optimal signal to the monitor detector. Further, previous scattering did not insure the entire beam was being monitored.

Further, light from light emitting devices used in a transmitter needs to be coupled to corresponding fibers. As the use of non-physical contact connections between light sources and fibers increases, the need for effective isolation to prevent light reflected at the fiber interface from being returned to the light source increases. Feedback to the light source may result in spectral broadening, light source instability, and relative intensity noise, which affect the monochromaticity of the light source. As data rates go up, the systems become more sensitive to relative intensity noise and require low bit error rates. Conventional optical isolators using polarization effects to attenuate reflection are very expensive, making the non-physical contact impractical. The importance of avoiding feedback is further increased when trying to use cheaper light sources, such as vertical cavity surfaces emitting laser diodes and light emitting diodes.

One solution that avoids the use of an optical isolator is a mode scrambler that divides power from the light source into many modes. A configuration employing a mode scrambler includes a single mode pigtail that provides light from the light source to the mode scrambler that then delivers the light to a transmission cable via an air-gap connector. Since any reflected power will still be divided across the many modes, any reflected power in the mode that can efficiently be coupled into the pigtail is only a small fraction of the total reflected power, thereby reducing return losses. However, this solution involves aligning another fiber, physically contacting the fiber with the mode scrambler, and placing the light source against the fiber. This pigtailing is expensive. Thus, there still exists a need for true nonphysical contact connection between a light source and a transmission system that does not require an isolator.

SUMMARY OF THE INVENTION

The present invention is therefore directed to power monitoring and coupling light from an array of light emitting devices that substantially overcomes one or more of the problems due to the limitations and disadvantages of the related art.

The above and other objects may be realized by providing an integrated parallel transmitter including an array of light emitting devices, an optical system comprising at least two surfaces, a corresponding array of diffractive optical elements on one of the at least two surfaces splitting off a percentage of the light beam to create a monitor beam for each of the light emitting devices, another optical element on one of the at least two surfaces which performs further optical functioning on the monitor beam, a detector for measuring power of the monitor beam, and a corresponding plurality of couplers which couple remaining light not split off into a corresponding waveguide.

The optical system may further include performing at least one optical function to the functional light beam. The at least one optical function may include focusing the functional beam into a fiber. The diffractive optical element may be a transmission diffractive deflecting a percentage of the light beam to form a deflected beam. The another optical element may include a focusing optical element that focuses the monitor beam onto the detector. The integrated parallel transmitter may include metal on a surface opposite the transmission diffractive element, the metal reflecting the monitor beam. The light-emitting device may be a VCSEL array and the diffractive optical element and the detector are provided for each VCSEL in the VCSEL array. All elements of the optical system may be integrated onto a single substrate. The optical system may include at least three surfaces. The coupler may be a phase-matching coupler. The array of couplers may be formed on a same surface of the optical system and the array of diffractive optical elements may be formed on a same surface of the optical system. The light emitting devices and the power monitors may be mounted on a bottom surface of the optical system or may be mounted on a substrate separate from the optical system.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 1A:
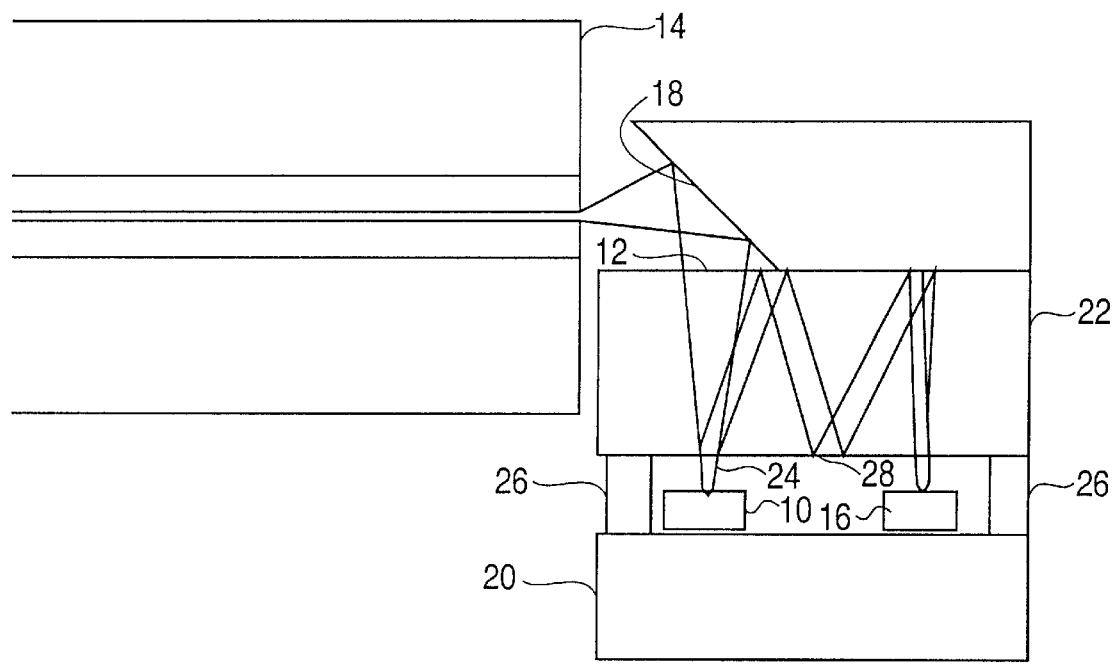
FIG. 1A is a side view and FIG. 1B is a top view of the integrated parallel transmitter of the present invention.

FIG. 1A illustrates a light source 10, here a VCSEL, a coupler 12 and a multi-mode fiber 14 integrated with a power monitor 16 and a reflective surface 18 for directing the light into the fiber 14. In particular, the light source 10 and the power monitor 16 are provided on a substrate 20. Another substrate 22 has the coupler 12 thereon, preferably on the face furthest from the light source to allow the beam to expand, and a splitting diffractive element 24 which splits off a portion of the light from the light source 10 to be monitored. The substrates 20, 22 are preferably mounted with spacer blocks 26, which provide the desired separation between the substrates 20, 22. The coupler 12 may also be provided in a common housing with the fiber 14.

The light split off by the diffractive element 24 is directed to the power monitor 16 to monitor the operation of the light source 10. The directed of the light to the power monitor 16 may be achieved by providing appropriately positioned reflective portions 28. The number of times the light to be monitored traverses the substrate 22 is a design choice, depending on the initial angle of diffraction and the desired positioning of the power monitor 16. This monitoring is set forth in U.S. Pat. No. 6,314,223, entitled "A Diffractive Vertical Cavity Surface Emitting Laser Power Monitor and System", which is hereby incorporated by reference in its entirety for all purposes. Alternatively, the power monitoring may be realized using an integrated detector, without the need for the deflecting element, as set forth in U.S. Pat. No. 6,452,669, entitled "Transmission Detection for Vertical Cavity Surface Emitting Laser Power Monitor and System", which is hereby incorporated by reference in its entirety for all purposes.

The light that is not split off by the diffractive element 24 proceeds to the coupler 12. A reflective surface 18, such as a polished angular face of another substrate, is provided to direct the light from the coupler 12 into the multi-mode fiber 14. Preferably all the optical elements are formed lithographically and all the elements are integrated on a wafer level.

Figure 2:
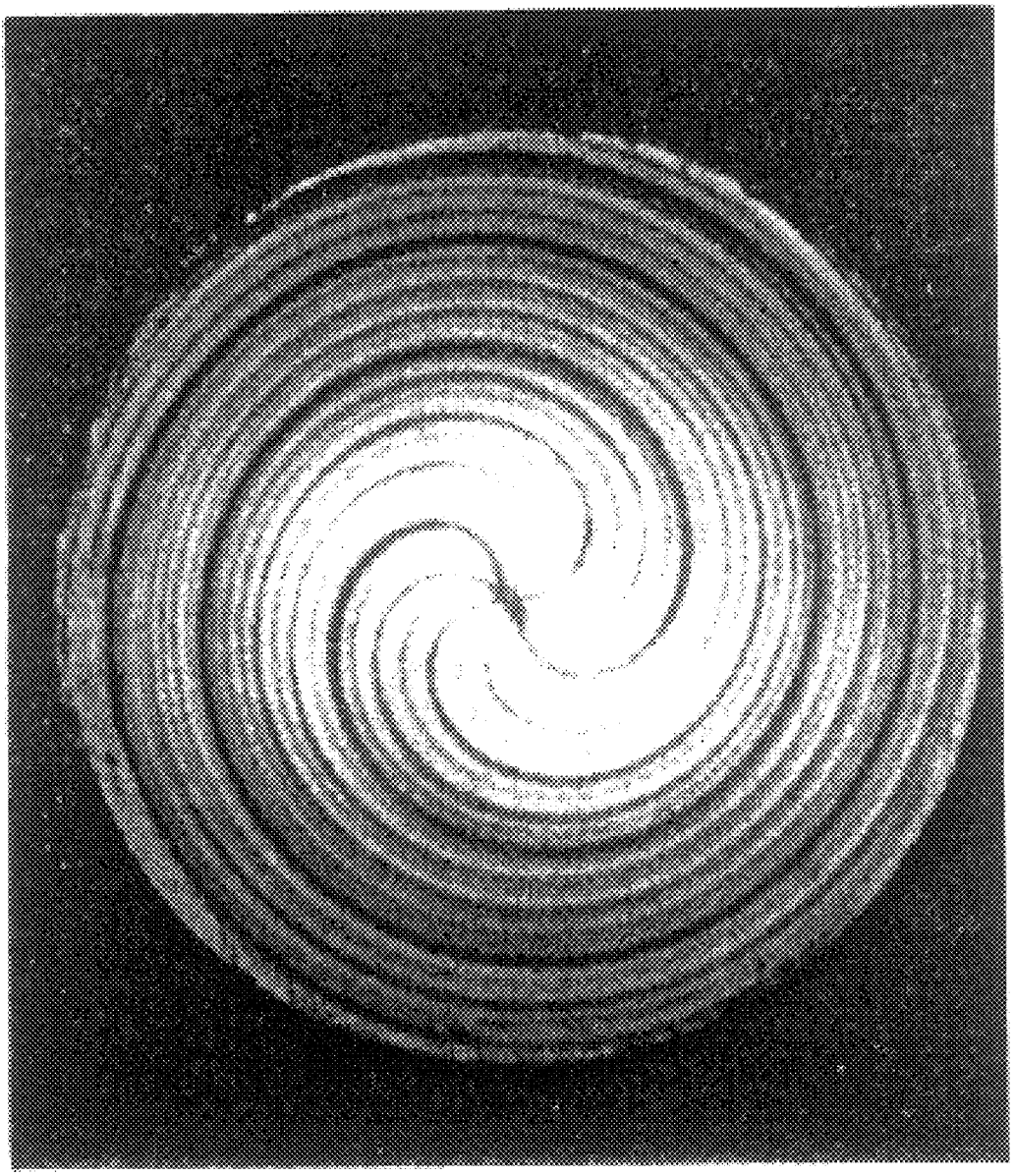
FIG. 2 an intensity pattern of a diffractive coupler to be used in the present invention.

In accordance with the present invention, the coupler 12 is a diffractive element that matches the phase as well as the intensity distribution of the beam. FIG. 2 illustrated the corresponding intensity pattern of such a diffractive coupler 12. A refractive equivalent may also be used.

The matching of the phases generates spiral propagation of the beam through the fiber. This spiral or vortex propagation maintains the intensity profile input to the fiber along the fiber. Since the beam travels in a corkscrew, the amount of light crossing the center of the fiber is significantly reduced. Ideally, the amount of light in the center will be zero, but in practice, the amount of light is on the order of 10% or less. In contrast, when only the intensity distribution is controlled, the input intensity profile may be the desired profile, but will quickly degrade as the light traverses the fiber. In other words, while the other designs may provide an input profile that is substantially null on axis, this profile is only maintained for the depth of focus of the coupler. When also matching the phase, this profile is maintained substantially beyond the depth of focus of a lens having the same numerical aperture as the beam to be input to the fiber, e.g., at least an order of magnitude longer. Absent the fiber, the null space of the beam profile is maintained through free space, which significantly reduces the alignment requirement. Further, by matching the phase and amplitude of the beam to a certain mode of the fiber, theoretically the beam profile could be maintained over an infinite length of fiber. However, imperfections in the real world, e.g., in the fiber, in the beam, in the matching, degrade from this theoretical scenario. Thus, in order to avoid low order modes in a fiber launch, the amplitude and phase of the higher order modes need to be matched, as set forth in U.S. application Ser. No. 09/329,996 filed Jun. 11, 1999, now allowed, which is hereby incorporated by reference in its entirety for all purposes.

In addition to efficiently coupling the light into the fiber, the phase matching coupler 12 also reduces the power being fedback into the light source 10, as set forth in U.S. Pat. No. 6,496,621, which is hereby incorporated by reference in its entirety for all purposes. Since the phases are matched, and the reflected light will not have the same phase as it did when originally incident on the phase matching coupler 12, the phase matching coupler 12 will not return the light back to the light source as it came. In other words, when the reflected light traverses the system, it will be further deflected by the phase matching coupler 12, thereby reducing the power fedback into the light source 10.

The back reflection reduction of the phase matching coupler only operates sufficiently when the phase matching coupler 12 is far enough away from the fiber so that the phase is sufficiently changed to prevent being redirected in the same manner. In other words, if the phase matching coupler 12 is placed in contact with the end of the fiber, while the coupler will still serve to maintain the input distribution, since the reflected light will have essentially the same phase as the input light, the light will be returned substantially back to the light source as it came. However, if the phase matching coupler 12 is placed at least roughly three times the diameter of the beam incident on the fiber, there is sufficient alteration of the phase due to traversal that the reflect light incident on the phase matching coupler 12 will be further deflected.

Figure 1B:
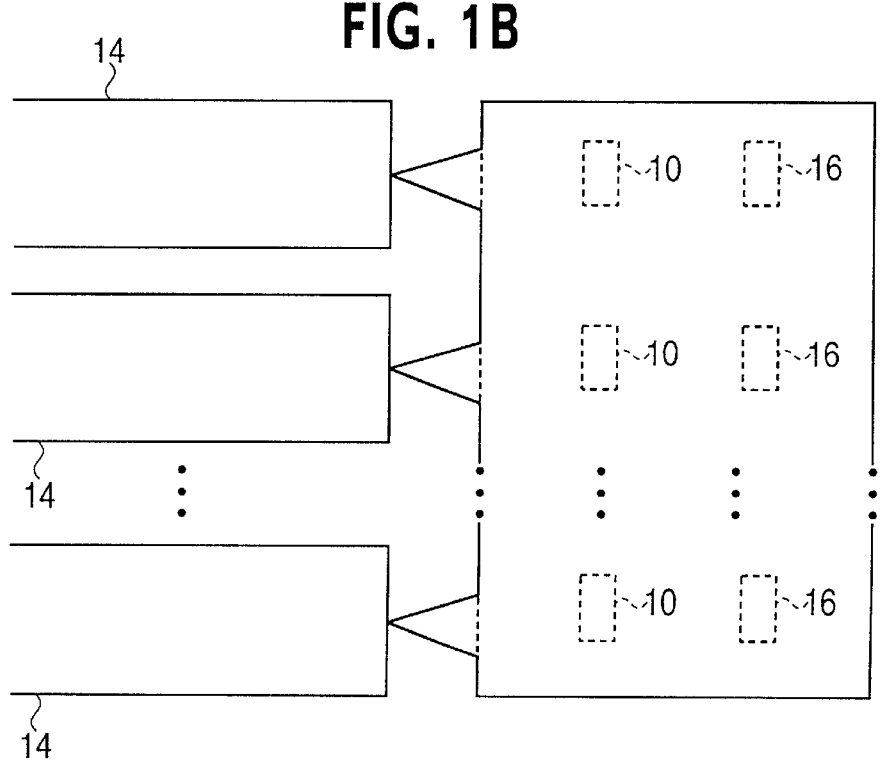

The top view of the configuration of FIG. 1A is shown in FIG. 1B in which the parallel arrays can be seen. The parallel arrays may have any desired number of constituent elements. The active elements, i.e., the VCSELs 10 and the power monitors 16, are shown in outline form. As can be seen, each VCSEL 10 has its own power monitor 16. The other integrated elements have been omitted for clarity, but are the same as shown in FIG. 1A and are formed over the continuous structures as shown in FIG. 1B.

Figure 3:
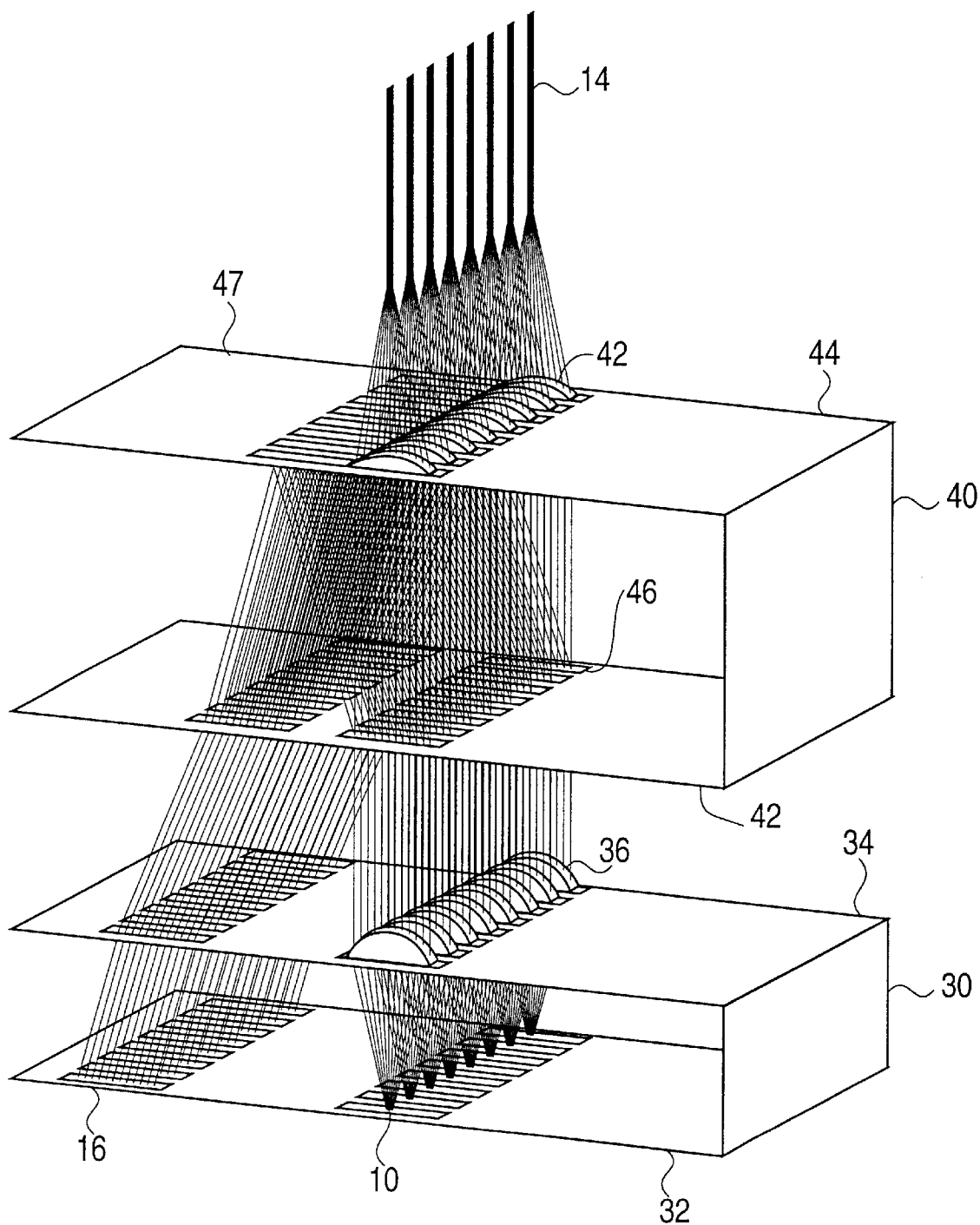
FIG. 3 is a schematic elevational exploded view of an integrated parallel transmitter in accordance with the present invention.

Another configuration of a parallel array transmitter is shown in FIG. 3. Here, the array of light emitters 10 and the array of power monitors 16 are attached to a bottom surface 32 of a first substrate 30. An optical element 36, one for each light emitter 10, on a second surface 34 of the first substrate 30 collimates the light. A diffractive element 46, formed on a first surface 42 of a second substrate 40, splits off a portion of the beam to be monitored. This split off portion is directed a reflection portion 47 on a second surface 44 of the second substrate 40. The reflected beam then traverses back through the first and second substrates to the power monitor array 16. Of course, other optical elements may be corresponding provided on the first and second substrates to either further reflect or diffract the reflected beam, depending upon a desired positioning of the power monitors.

The application beam, i.e., the beam to be coupled to the fibers traverses the second substrate and is incident on a corresponding coupler 48, which couples the beams into the corresponding fibers 14. Preferably, this coupler is a phase-matched coupler discussed above.

Thus, the configuration in FIG. 3 clearly illustrates how all of the optical elements needed for coupling and monitoring the beams are integrated onto substrates. These substrates 30, 40 are preferably bonded together with a spacer there between, such as spacer 26 shown in FIG. 1A. These elements are preferably formed on a wafer level, such as set forth in U.S. Pat. No. 6,096,155, which is hereby incorporated by reference in its entirety for all purposes, and then diced to include the desired number of optical elements. Thus, all of the elements that have been integrated have also been aligned on the wafer level.

While typically the entire beam is to be used, if only part of the beam is used, the diffractive element may create the monitor beam only from the portion of the beam to be used in the application. For example, if coupling the light to a fiber, only the portion of the beam that will be delivered to the core region of the fiber may be monitored.

Although preferred embodiments of the present invention have been described in detail herein above, it should be clearly understood that many variations and/or modifications of the basic inventive concepts taught herein, which may appear to those skilled in the art, will still fall within the spirit and scope of the present invention as defined in the appended claims and their equivalents. For example, the optical elements shown do not necessarily have to be positioned on a particular wafer surface, and an optical element may provide more than one function.

What is claimed is:

1. An integrated parallel transmitter comprising:
   an array of light emitting devices;
   an optical system comprising at least two surfaces;
   a corresponding array of diffractive optical elements on one of said at least two surfaces splitting off a percentage of the light beam to create a monitor beam for each of the light emitting devices;
   another optical element on one of said at least two surfaces which performs further optical functioning on the monitor beam;
   a detector for measuring power of the monitor beam; and
   a corresponding plurality of couplers which couple remaining light not split off into a corresponding waveguide.

2. The integrated parallel transmitter of claim 1, wherein said optical system further comprises performing at least one optical function to the functional light beam.

3. The integrated parallel transmitter of claim 2, wherein said at least one optical function comprises focusing said functional beam into a fiber.

4. The integrated parallel transmitter of claim 1, wherein the diffractive optical element is a transmission diffractive deflecting a percentage of the light beam to form a deflected beam.

5. The integrated parallel transmitter of claim 1, wherein said another optical element comprises a focusing optical element which focuses the monitor beam onto the detector.

6. The integrated parallel transmitter of claim 4, further comprising metal on a surface opposite the transmission diffractive element, said metal reflecting the monitor beam.

7. The integrated parallel transmitter of claim 1, wherein the light emitting device is a VCSEL array and said diffractive optical element and said detector are provided for each VCSEL in the VCSEL array.

8. The integrated parallel transmitter of claim 1, wherein all elements of said optical system are integrated onto a single substrate.

9. The integrated parallel transmitter of claim 1, wherein the optical system includes at least three surfaces.

10. The integrated parallel transmitter of claim 1, wherein the coupler is a phasematching coupler.

11. The integrated parallel transmitter of claim 1, wherein the array of couplers are formed on a same surface of the optical system and the array of diffractive optical elements are formed on a same surface of the optical system.

12. The integrated parallel transmitter of claim 1, wherein the light emitting devices and the power monitors are mounted on a bottom surface of the optical system.

13. The integrated parallel transmitter of claim 1, wherein the light emitting devices and the power monitors are mounted on a substrate separate from the optical system.

14. The integrated parallel transmitter of claim 1, wherein the at least two surfaces are parallel to one another.

15. The integrated parallel transmitter of claim 1, wherein the light emitting devices and the power monitors are mounted in a same plane.

16. The integrated parallel transmitter of claim 15, wherein the light emitting devices and the power monitors are mounted on a same surface.

17. The integrated parallel transmitter of claim 1, wherein the couplers are coupling diffractive optical elements.

18. The integrated parallel transmitter of claim 17, wherein the coupling diffractive optical elements are to provide the remaining light to a corresponding optical waveguide.

19. The integrated parallel transmitter of claim 18, wherein the coupling diffractive optical elements output light matching the intensity profile of the optical waveguide.

20. The integrated parallel transmitter of claim 19, wherein the coupling diffractive optical elements output light matching the phase profile of the optical waveguide.

21. The integrated transmitter of claim 1, wherein the light emitting devices and the power monitors are mounted in a same plane.

22. The integrated transmitter of claim 21, wherein the light emitting devices and the power monitors are mounted on a same surface.

23. An integrated transmitter comprising:
   a light emitting device;
   an optical system comprising at least two surfaces;
   a diffractive optical element on one of said at least two surfaces splitting off a percentage of the light beam to create a monitor beam for each of the light emitting devices;

a detector for measuring power of the monitor beam; and a coupler which couple remaining light not split off into a corresponding waveguide.

24. The integrated transmitter of claim 23, wherein said optical system further comprises performing at least one optical function to the functional light beam.

25. The integrated transmitter of claim 24, wherein said at least one optical function comprises focusing said functional beam into a fiber.

26. The integrated transmitter of claim 23, wherein the light emitting devices and the power monitors are mounted on a substrate separate from the optical system.

27. The integrated transmitter of claim 23, wherein the at least two surfaces are parallel to one another.

28. The integrated transmitter of claim 23, wherein the couplers are coupling diffractive optical elements.

* * * * *